US007468791B2

(12) United States Patent
Samukawa et al.

(10) Patent No.: US 7,468,791 B2
(45) Date of Patent: Dec. 23, 2008

(54) OBJECT RECOGNITION SYSTEM FOR VEHICLE

(75) Inventors: Yoshie Samukawa, Kariya (JP); Tsutomu Natsume, Nagoya (JP); Keiko Okuda, Ogaki (JP)

(73) Assignee: Denso Corporation, Kariya (JP)

( * ) Notice: Subject to any disclaimer, the term of this patent is extended or adjusted under 35 U.S.C. 154(b) by 299 days.

(21) Appl. No.: 11/099,974

(22) Filed: Apr. 6, 2005

(65) Prior Publication Data

US 2005/0225744 A1 Oct. 13, 2005

(30) Foreign Application Priority Data

Apr. 9, 2004 (JP) ............................. 2004-115588

(51) Int. Cl.
*G01J 1/42* (2006.01)

(52) U.S. Cl. ..................... 356/325; 356/4.01; 701/96; 701/300; 342/70; 342/71

(58) Field of Classification Search ............... 356/28, 356/4.01, 325; 701/96, 300; 342/70, 71
See application file for complete search history.

(56) References Cited

U.S. PATENT DOCUMENTS

| 5,160,971 | A | * | 11/1992 | Koshizawa | .................. 356/5.05 |
| 5,574,463 | A | | 11/1996 | Shirai et al. | |
| 6,147,637 | A | * | 11/2000 | Morikawa et al. | .............. 342/70 |
| 6,198,987 | B1 | * | 3/2001 | Park et al. | ....................... 701/1 |
| 2002/0014988 | A1 | * | 2/2002 | Samukawa et al. | ............ 342/70 |
| 2004/0104837 | A1 | | 6/2004 | Samukawa et al. | |
| 2004/0257556 | A1 | | 12/2004 | Samukawa et al. | |
| 2005/0093735 | A1 | * | 5/2005 | Samukawa et al. | ............ 342/70 |

FOREIGN PATENT DOCUMENTS

| JP | 9-292464 | 11/1997 |
| JP | 10-213650 | 8/1998 |
| JP | 11-038141 | 2/1999 |
| JP | 2002-202361 | 7/2002 |
| JP | 2004-198323 | 7/2004 |

OTHER PUBLICATIONS

Notice of Rejection dated Nov. 14, 2006 in Japanese Application No. 2004-115588 with English translation.

* cited by examiner

*Primary Examiner*—Thomas H. Tarcza
*Assistant Examiner*—Timothy A Brainard
(74) *Attorney, Agent, or Firm*—Harness, Dickey & Pierce, PLC

(57) ABSTRACT

An object recognition device for a vehicle includes a size determining means, an existence condition determining means, and an adverse condition determining means. The size determining means determines that the recognized objects are large when a size of the objects is larger than a given determination value. The existence condition determining means determines whether at least a given number of the objects are determined to be large by the size determining means. The adverse condition determining means identifies an adverse condition related to recognizing the objects when at least the given number of the objects are determined to be large by the existence condition determining means.

24 Claims, 10 Drawing Sheets

OBJECT RECOGNITION SYSTEM FOR VEHICLE

CROSS REFERENCE TO RELATED APPLICATIONS

This application is based upon and claims the benefit of priority of Japanese Patent Application No. 2004-115588, filed on Apr. 9, 2004, the contents of which are incorporated herein by reference.

FIELD OF THE INVENTION

The present invention relates to an object recognition device for a vehicle and, more particularly, an object recognition device and program for recognizing an object in front of the vehicle based on transmitted and reflected waves.

BACKGROUND OF THE INVENTION

Up to now, there has been proposed an object recognition device that irradiates transmitting waves such as light waves or millimeter waves over a given angle in front of the subject vehicle. The device then detects reflected waves to recognize an object (target) in front of the subject vehicle.

This type of device detects an interval between the subject vehicle and an anterior vehicle. When the interval becomes shorter, an alarm is generated or a device that controls a vehicle speed so as to maintain a given distance between the subject vehicle and an anterior vehicle is operated.

For example, Japanese patent document JP-11-38141A at page 7 discloses an object recognition device for a vehicle with a laser radar sensor that irradiates a plurality of laser beams in front of a subject vehicle over given angle of ranges in a vehicle width direction and a vehicle height direction, and recognizes a target such as an anterior vehicle on the basis of reflected laser beams.

However, the laser radar sensor suffers from such a problem that the laser radar sensor cannot sufficiently recognize the anterior target in the case where a stain or a water droplet adheres to a surface of the sensor.

To cope with the above problem, there has been proposed a technique in which a condition of the sensor surface determined according to a condition of the laser beams that are reflected from the sensor surface (refer to Japanese Patent Application No. 2003-176820). Additionally, a technique has been proposed in which a condition of the sensor surface is determined according to a decrease of the detected distance (refer to Japanese patent document JP-11-94946A at page 6).

However, the above-described techniques are not always sufficient to eliminate the above problem and more improvement is desired.

That is, in the case where a stain or water droplets adhere to the sensor surface, the width of the laser beam is widened, as a result of which the anterior target seems larger than the natural size or cannot be divided from the surroundings.

As a result, there arises such a problem that appropriate control based on that information cannot be performed because correct information on the anterior target is not obtained.

SUMMARY OF THE INVENTION

The present invention has been made to solve the above-described problem and, therefore, an object of the present invention is to provide an object recognition device that is capable of precisely detecting an adverse condition in which a stain or water droplets adhere to a sensor surface and a program controlling such a device.

In order to achieve the above object, one aspect of the present invention provides an object recognition device for a vehicle, which irradiates transmitting waves onto the surroundings of a subject vehicle, acquires data corresponding to objects around the subject vehicle on the basis of reflected waves of the transmitting wave, and recognizes the objects on the basis of the data. The object recognition device includes a size determining means for determining that the recognized object is large when a size of the objects is larger than a given determination value; an existence condition determining means for determining whether the objects that are determined to be large by the size determining means exist a given number or more; and an adverse condition determining means for determining a condition for obtaining the information of the objects is adverse when the objects that are determined to be large exist a given number or more by the existence condition determining means.

In the present invention, when the judgment is made that the recognized objects (that is, the objects recognized as not noises but objects) are larger than the given size, and the large objects exist a given number of judgment values or more, for example, there exist the large objects as many as normally impossible, it is determined that the condition in which the information of the object is obtained is adverse.

That is, as described above, in the case where stain adheres to the sensor surface or water droplets adhere to the sensor surface due to the adverse weather conditions, the width of the laser beam becomes widened, and the anterior object seems larger than the natural size or cannot be divided from the surroundings. Accordingly, in the case where the above phenomenon becomes remarkable, it is judged as the condition in which the stain or water droplets adhere to the sensor surface, that is, the adverse condition that is not preferable to obtain the information on the anterior object (the conditions in which the detection performance is deteriorated, and the reliability of the obtained data is low).

As a result, in the case of the above adverse conditions, since the vehicle control such as tracking control using data of laser radar. There is obtained the noticeable effect such that the safety of the vehicle travel is improved.

The determination value of whether the object is large, or not, or the determination value of whether the large objects exist a given number or more, or not, can be set according to experiments.

According to another aspect of the present invention, there is provided an object recognition device as described above in which a given number or more of the objects that are determined as the large objects exist in an object group including the recognized plurality of objects.

According to the present invention, since it is determined whether the large objects of a given number or more exist in a given number (for example, 18) of recognized objects (object group), or not, a precision in the determination can be enhanced.

According to another aspect of the present invention, there is provided the object recognition device as described above in which a plurality of determinations of the object group are implemented, and it is determined that the conditions are adverse on the basis of the plural judgment results.

According to the present invention, since the above-mentioned determinations of the object group are implemented several times, and those determination results are pieced together to judge that the conditions are adverse, there is advantageous in that the judgment precision is more improved.

According to another aspect of the present invention, there is provided the object recognition device as described above, in which it is determined that a given number or more of the large objects exist, or a given rate or more as the determination that the large objects exist the given number or more by the existence condition judging means.

The present invention exemplifies the determining manner of the existence condition determining means, and for example, the existence state of the large objects can be surely determined according to the number or rate of large objects in the respective object groups.

According to another aspect of the present invention, there is provided the object recognition device described above, wherein a counter value used for determination of the adverse conditions is changed according to the number or rate of the objects that are determined as the large objects.

According to the present invention, since the counter value (for example, a large target counter value) used for determination of the adverse conditions is changed according to the number or rate of the objects that are determined as the large objects, it can be readily determined on the basis of the counter value that the conditions are adverse.

According to another aspect of the present invention, there is provided the object recognition device described above, wherein a variable value that changes the counter value (for example, increases or decreases) is set for each of the object groups.

Since it is predicted that the number or rate of large objects is different in each of the object groups, the counter value is changed according to the number or rate, thereby making it possible to precisely conduct the determination of the adverse conditions.

For example, there can be applied a method in which when the number or rate of large objects is large, the counter value is greatly increased whereas when the number or rate of large objects is small the counter value is hardly increased (or the counter value is not changed or is decreased).

According to another aspect of the present invention, there is provided the object recognition device described above, wherein determination is made taking the operation of a wiper into consideration when it is determined that the conditions are adverse.

When the wiper is operated, it is estimated that the conditions are adverse such as rainy conditions. Accordingly, with addition of this determination, the determination of the adverse conditions can be conducted with high precision.

According to another aspect of the present invention, there is provided the object recognition device described above, wherein it is determined that the objects are large when all of the following conditions are satisfied:

a distance to the object is within a given range (condition A);

a lateral position of the object is within a given range (condition B);

a lateral width of the object is a given threshold value C or more (condition C);

the lateral width of the object is a given threshold value D or more (condition D: the threshold value C<the threshold value D); and a velocity of the subject vehicle is a given value or higher (condition F).

The present invention exemplifies conditions for determining the recognized objects are large, or not. As a result, it can be surely determined that the objects are large, or not.

According to another aspect of the present invention, there is provided the object recognition device described above, wherein in the case where any one of the conditions A, B, C, D and F is not satisfied, it is not determined that the objects are large.

The present invention exemplifies conditions (unsatisfied conditions) for determining that the objects are not large.

According to yet another aspect of the present invention, there is provided the object recognition device described above, wherein it is determined that the objects are large when all of the following conditions are satisfied:

a distance to the object is within a given range (condition A);

a lateral position of the object is within a given range (condition B);

a lateral width of the object is a given threshold value C or more (condition C);

a depth of the subject vehicle is a given threshold value or more (condition E); and a velocity of the subject vehicle is a given value or higher (condition F).

The present invention exemplifies conditions for determining whether the recognized objects are large, or not. In the present invention, the depth D of the subject vehicle is added to the determination conditions. As a result, it can be surely determined whether the objects are large, or not.

According to yet another aspect of the present invention, there is provided the object recognition device described above, wherein in the case where any one of the conditions A, B, C, E and F is not satisfied, it is not determined that the objects are large.

The present invention exemplifies determination conditions (unsatisfied conditions) that the objects are not large.

According to yet another aspect of the present invention, there is provided the object recognition device described above, wherein in the case where the velocity of the subject vehicle is lower than a given determination value (for example, in the case where the velocity is lower than the given value in the condition F), the counter value is set to 0.

In the case where the velocity of the subject vehicle is low, for example, in the case where the velocity of the subject vehicle is low because the anterior vehicle stops due to traffic congestion, since the same conditions continue, the determination of the adverse conditions is liable to be established in a short time. Accordingly, in such conditions, the counter value is set to 0, and the determination of the adverse conditions is prevented.

According to still another aspect of the present invention, there is provided the object recognition device described above, wherein in the case where a state in which the counter value is 0 continues for a given period of time after the determination of the adverse conditions is established, the determination of the adverse conditions is canceled.

The present invention exhibits the contents that the determination of the adverse conditions is canceled in the case where the adverse conditions are determined. That is, in the case where a state in which the counter value is 0 continues for a given period of time, it is judged that the adverse conditions are improved, and the determination of the adverse conditions is canceled.

According to still another aspect of the present invention, there is provided a program for realizing functions of the respective means of the object recognition device for a vehicle described above.

That is, the functions of the above-described object recognition device for a vehicle can be realized by processing that is executed by program of the computer.

The above program is recorded in a computer readable recording medium such as an FD, an MO, a DVD-ROM, a CD-ROM, or a hard disc, and loaded in a computer as occasion demands and starts in use. Otherwise, it is possible that this program is recorded in a ROM or a backup ROM as a computer readable recording medium in advance, and the ROM or the backup RAM is incorporated into the computer.

Other features and advantages of the present invention will be appreciated, as well as methods of operation and the function of the related parts from a study of the following detailed description, appended claims, and drawings, all of which form a part of this application. In the drawings:

DETAILED DESCRIPTION OF THE PREFERRED EMBODIMENTS

Now, a description will be given in more detail of preferred embodiments of the present invention with reference to the accompanying drawings.

In this embodiment, an object recognition device is applied to a vehicular gap control device.

First, the systematic structure of this embodiment will be described.

Figure 1:
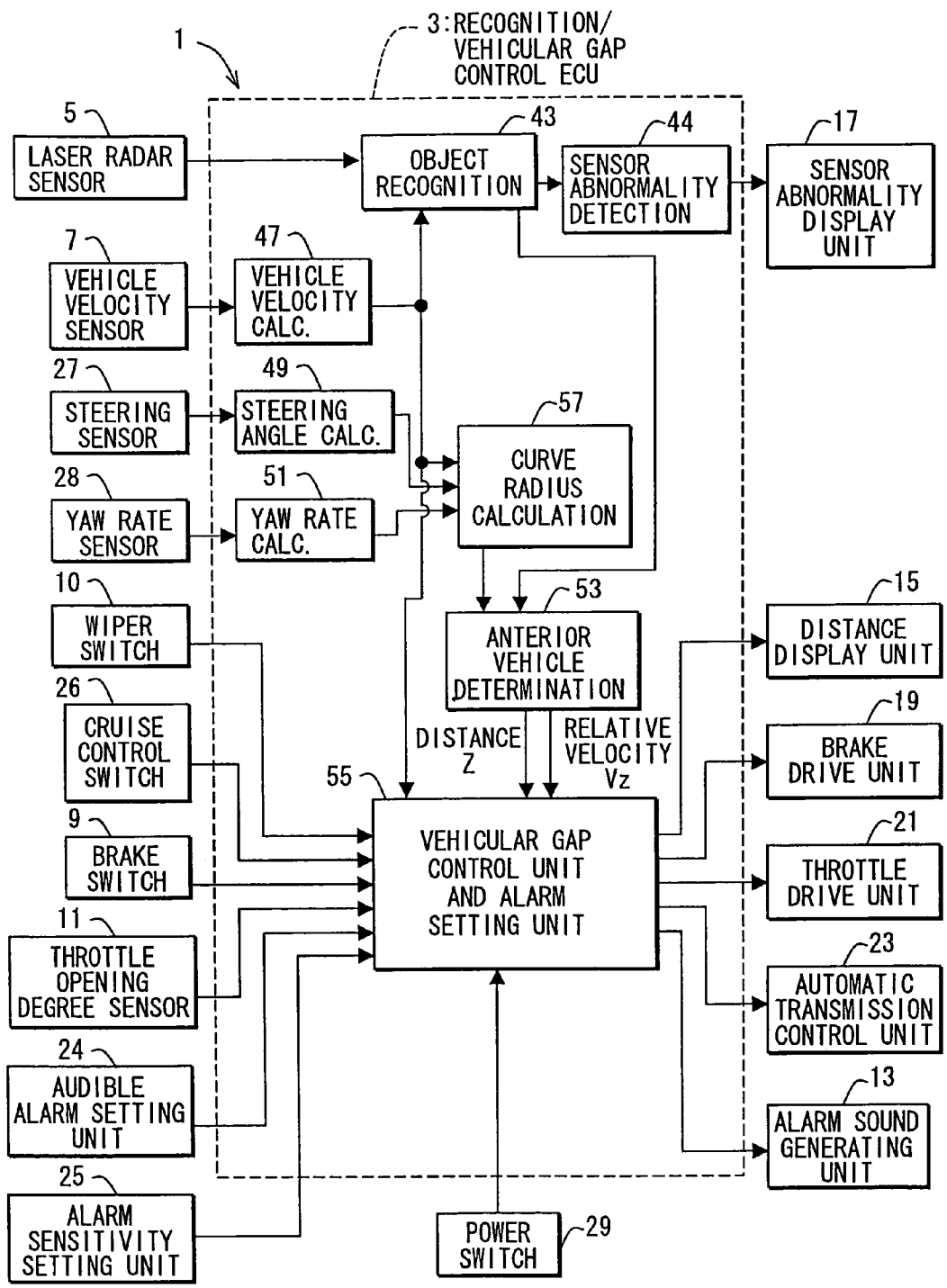
FIG. 1 is a block diagram showing a vehicular gap control device according to the present invention.

FIG. 1 is a system block diagram showing a vehicular gap control device 1.

The vehicular gap control device 1 is mainly made up of a recognition/vehicular gap control ECU 3. The recognition/vehicular gap control ECU 3 is mainly made up of a microcomputer and includes an input/output interface (I/O). Those hard structures are general, and therefore their detailed description will be omitted.

The recognition/vehicular gap control ECU 3 inputs the respective detection signals from a laser radar sensor 5, a vehicle velocity sensor 7, a brake switch 9, a wiper switch 10 and a throttle opening sensor 11, and outputs drive signals to an audible alarm generating unit 13, a distance display unit 15, a sensor abnormality display unit 17, a brake drive unit 19, a throttle drive unit 21 and an automatic transmission control unit 23, respectively.

Also, the recognition/vehicular gap control ECU 3 is connected with an alarm volume setting unit 24 that sets an alarm volume, an alarm sensitivity setting unit 25 that sets the sensitivity in the alarm determination, a cruise control switch 26, a steering sensor 27 and a yaw rate sensor 28.

The recognition/vehicular gap control ECU 3 has a power switch 29, and upon turning on the power switch 29, given processing starts.

Figure 2A:
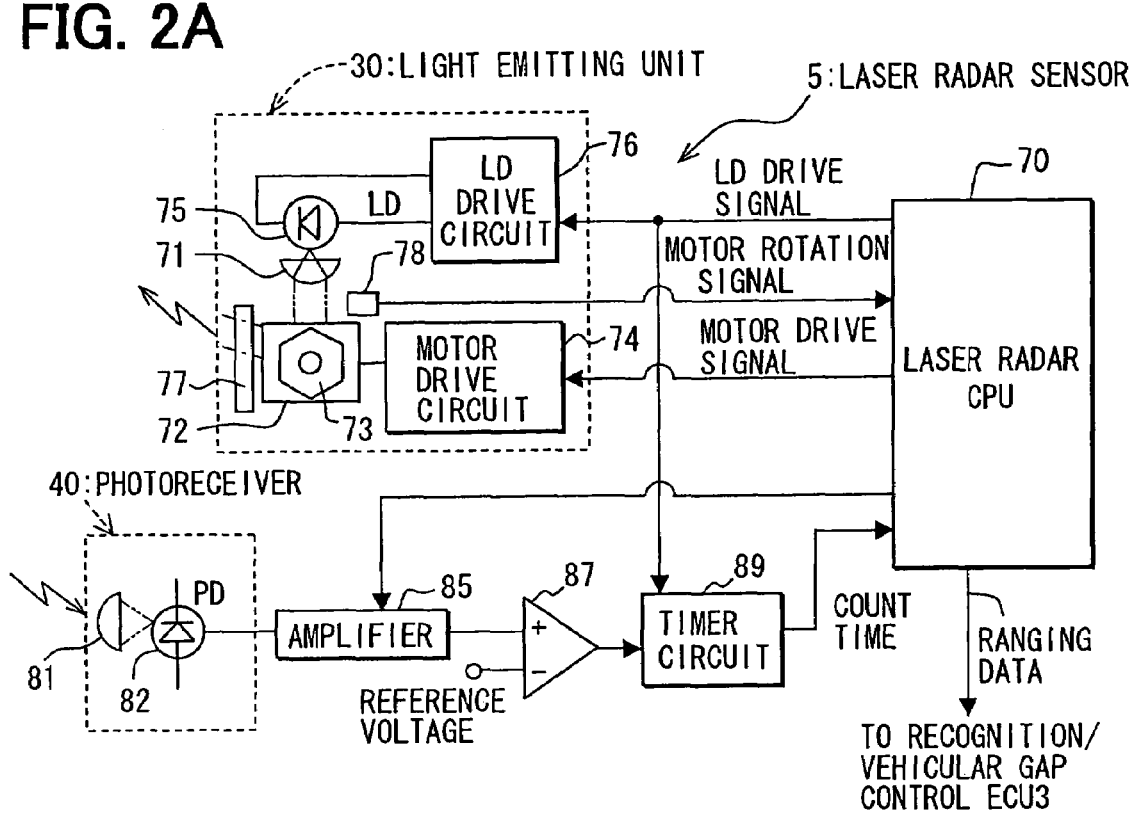
FIG. 2A is a block diagram showing a laser radar sensor of the vehicular gap control device of FIG. 1.

As shown in FIG. 2A, the laser radar sensor 5 is mainly made up of a light emission section 30, a photoreceiver 40 and a laser radar CPU 70.

The photoreceiver 40 has a semiconductor laser diode (LD) 75, and the laser diode 75 is connected to the laser radar CPU 70 through a laser diode driver circuit 76. The laser diode 75 radiates (emits) a pulsed laser beam according to a drive signal from the laser radar CPU 70, and the laser beam is irradiated to the external through a light emission lens 71, a scanner 72, and a glass plate 77. The glass plate 77 is a sensor surface that is exposed to the external, and stains or rain drops adhere to the glass surface 77.

In the scanner 72, a polygon mirror 73 is rotatably disposed centering on a vertical axis, and upon inputting a drive signal from the laser radar CPU 70 through a motor driver section 74, the polygon mirror 73 rotates due to a driving force of a motor not shown.

The rotational position of the motor is detected by a motor rotational position sensor 78, and then outputted to the laser radar CPU 70.

On the other hand, the photoreceiver 40 has a light sensitive element (PD: photo diode) 82. The light sensitive element 82 receives the laser beam that has been reflected by an object not shown through a light sensitive lens 81, and outputs a voltage corresponding to the intensity of the received light.

An output voltage of the light sensitive element 82 is outputted to a comparator after being amplified by an amplifier 85. The comparator 87 compares an output voltage of the amplifier 85 with a reference voltage, and outputs a given light receiving signal to a timer circuit 89 when the output voltage becomes larger than the reference voltage.

The timer circuit 89 also inputs a drive signal that is outputted from the laser radar CPU 70 to the laser diode driving circuit 76.

Figure 2B:
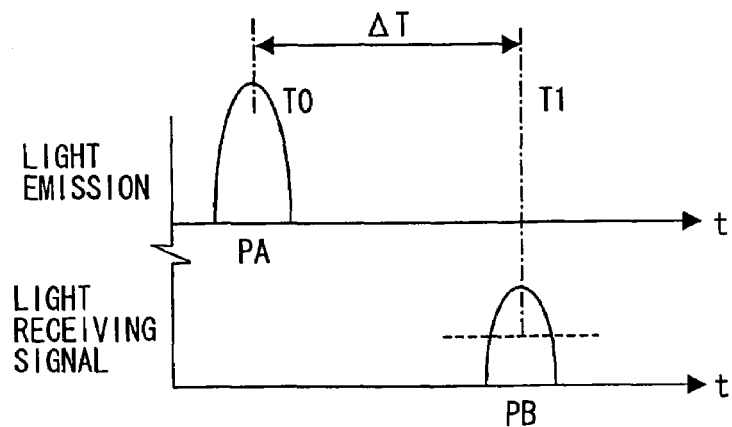
FIG. 2B is a graph illustrating a time delay of a distance detecting method in the laser radar sensor of FIG. 2A.

As shown in FIG. 2B, the timer circuit 89 encodes a phase difference between two pulses PA and PB (that is, a time difference $\Delta T$ between a time T0 at which the laser beam is outputted and a time T1 at which the reflected light is received) into a binary digital signal with the drive signal as a start pulse PA and the light receiving signal as a stop pulse PB.

Also, the stop pulse PB is used to measure a period of time during which the output voltage is equal to or higher than the reference voltage as the pulse width of the stop pulse PB. Then, the value is encoded into a binary digital signal and then outputted to the laser radar CPU 70.

The laser radar CPU 70 outputs an input time difference $\Delta T$ between two pulses PA and PB which have been inputted from the timer circuit 89, a scan angle $\theta x$ of the laser beam, and received light intensity data (corresponding to the pulse width of the stop pulse PB) to the recognition/vehicular gap control ECU 3 as ranging data.

The recognition/vehicular gap control ECU 3 recognizes the object on the basis of the ranging data from the laser radar sensor 5, and outputs the drive signal to the brake drive unit 19, the throttle drive unit 21 and the automatic transmission control unit 23 according to the conditions of the anterior vehicle which are obtained from the recognized object, to thereby control the vehicle velocity, that is, implement a so-called vehicular gap control.

Also, an alarm determining process that warns in the case the recognized object exists within a given alarm area for a given period of time is implemented at the same time. The object in this case corresponds to the anterior vehicle that travels in front of the subject vehicle.

Subsequently, the internal structure of the recognition/vehicular gap control ECU 3 will be described with reference to FIG. 1 as a control block.

The ranging data that has been outputted from the laser radar sensor 5 is transmitted to an object recognition block 43. In the object recognition block 43, the time difference $\Delta T$ and the scan $\theta x$ which are obtained as the ranging data in each of the scanning lines are transformed into X-Z orthogonal coordinates with the center of the laser radar sensor 5 as the origin (0,0), the vehicle widthwise direction as an X-axis, and the vehicle forward direction as a Z-axis.

The ranging data that has been transformed into the X-Z orthogonal coordinates is subjected to three kinds of integrating processes consisting of a pre-segment data making process, a main segment data making process and a targeting process. Those processes are epitomized in each of the objects that exist in front of the subject vehicle.

Then, the center position (X, Z) of the object, and the size (W, D) are obtained on the basis of the ranging data that has been epitomized in each of the objects. In addition, the relative velocity (Vx, Vz) of the object such as the anterior vehicle with respect to the subject vehicle position is obtained on the basis of a change in the center position (X, Z) of the object with time.

Also, in the object recognition block 43, it is determined whether the object is a static object or a moving object according to the vehicle velocity (subject vehicle velocity) that is outputted from the vehicle velocity calculating block on the basis of the detected value of the vehicle velocity sensor 7 and the relative velocity (Vx, Vz) that has been obtained as described above. W and D indicative of the size of the object are the lateral width and the depth, respectively. The model of the object having those data is called "target model."

Whether the data that has been obtained in the object recognition block 43 is within an abnormal range, or not, is detected by a sensor abnormality detection block 44, and in the case where the data is within the abnormal range, this face is displayed on a sensor abnormality display unit 17.

Also, the steering angle is obtained by a steering angle calculating block 49 on the basis of a signal from the steering sensor 27, and a yaw rate is calculated by a yaw rate calculating block 51 on the basis of a signal from the yaw rate sensor 28.

In a curve radius (radius of curvature) calculating block 57, a curve radium (radius of curvature) R is calculated on the basis of the vehicle velocity from the vehicle velocity calculating block 47, the steering angle from the steering angle calculating block 49, and the yaw rate from the yaw rate calculating block 51.

In an anterior vehicle determination block 53, an anterior vehicle from which a distance is shortest is selected on the basis of the curve radius R, and the center position coordinates (X, Z), the size of the object (W, D) and the relative velocity (Vx, Vz) which are obtained in the object recognition block 43 to obtain the distance Z and the relative velocity Vz with respect to the anterior vehicle.

Then, the vehicular gap control unit and alarm determination unit block 55 determines an alarm should be issued, or not, on the basis of the distance Z and the relative velocity Vz with respect to the anterior vehicle, the setting state of the cruise control switch 26, the pushing state of the brake switch 9, the opening degree from the throttle valve sensor 11, and the sensitivity setting value by the alarm sensitivity setting unit 25 if the alarm determination is made. When the cruise determination is made, the contents of the vehicle velocity control are determined. As a result, if the alarm is necessary, an alarm issuance signal is outputted to the audible alarm generating unit 13.

Also, if the cruise determination is made, the control signals are outputted to the automatic transmission control unit 23, the brake drive unit 19 and the throttle drive unit 21, vehicular control ECU 3 to implement necessary control. Then, when the control of those units is implemented, a necessary display signal is outputted to the distance display unit 15 to notify a driver of the conditions.

Subsequently, processing that is conducted in the recognition/vehicular gap control ECU 3 which is a main portion of this embodiment will be described with reference to FIGS. 3 and 4.

First, a process of determining the adverse conditions will be described with reference to FIG. 3. This process is implemented every given period.

Figure 3:
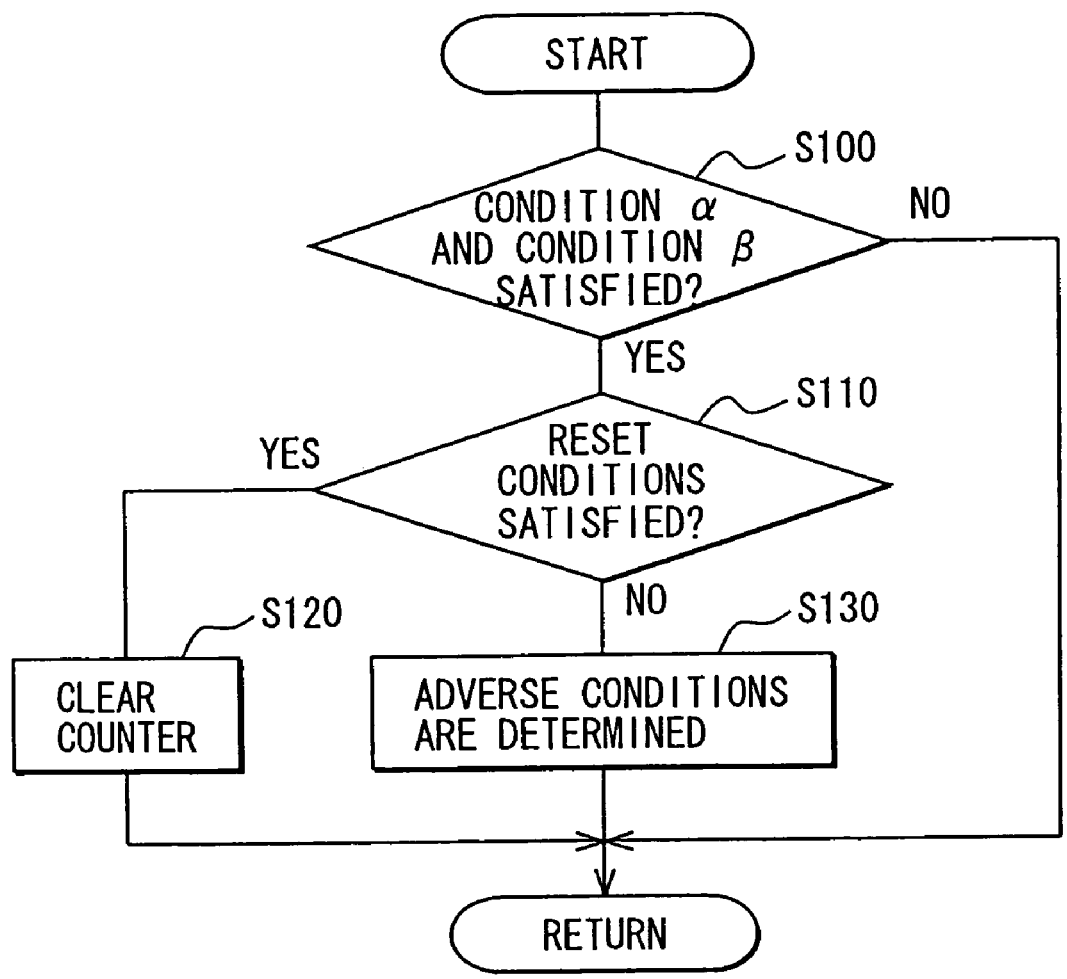
FIG. 3 is a flowchart showing an adverse condition determining process according to an embodiment of the present invention.
Figure 4:
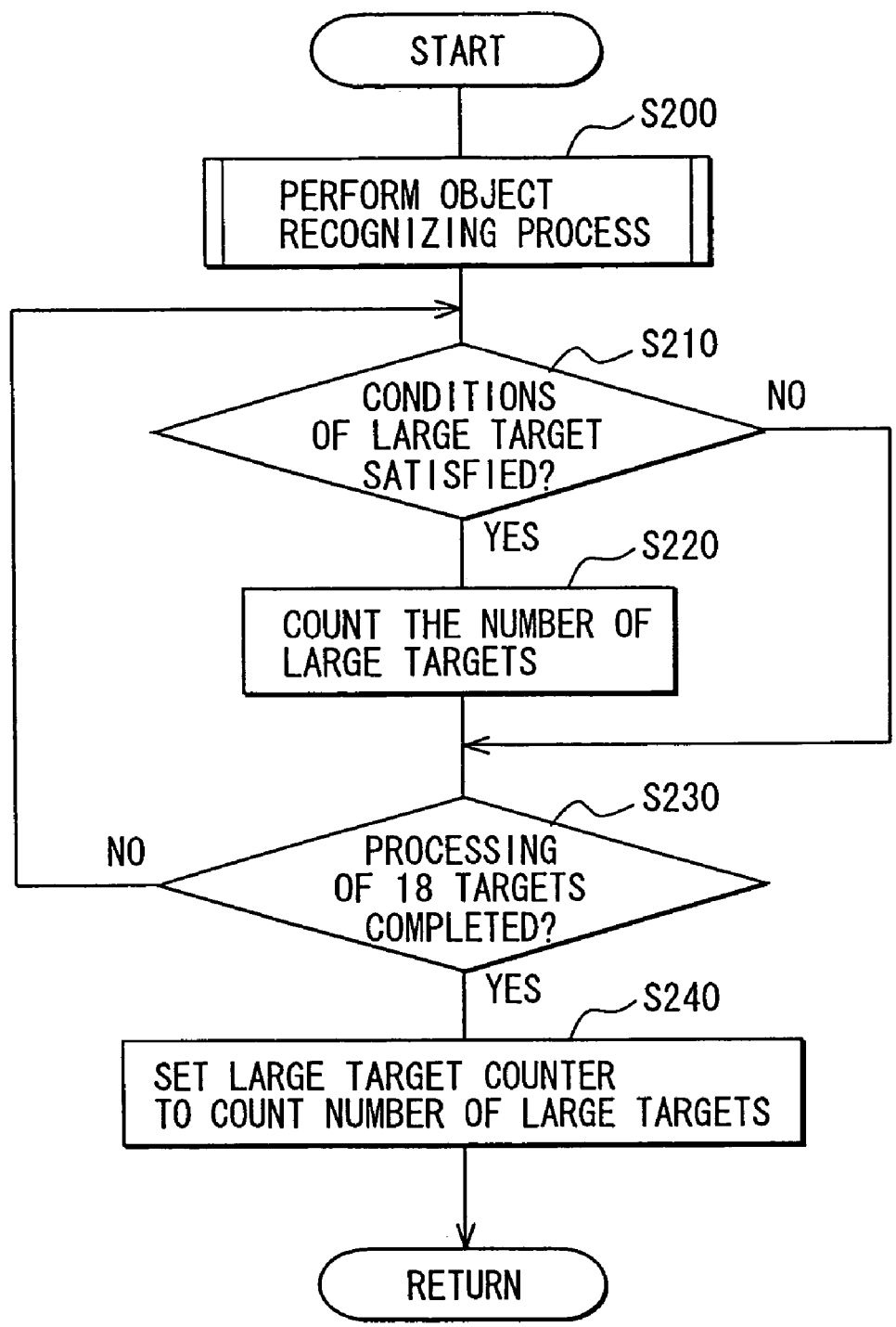
FIG. 4 is a flowchart showing a process of updating a large-target counter value of the present invention.

In Step S100 of FIG. 3, it is determined whether the conditions are adverse, or not. More specifically, it is determined whether both of a condition $\alpha$ and a condition $\beta$ are satisfied, or not. When the determination is yes in this step, then the processing is advanced to Step 110 whereas when the determination is no, this processing is terminated once.

The condition a exhibits $\alpha$ condition that "the wiper switch 10 is on", and when the wiper switch 10 is on, it is determined that the possibility of the adverse condition such as rain is high. That the wiper switch 10 is on is determined for 15 minutes after the wiper switch 10 turns off.

On the other hand, the condition $\beta$ exhibits a condition that "the counter value (large target counter value) used in determination of whether the object (target) is large, or not, is a given value (for example, 50) or more" which will be described later. If the large target counter value is 50 or more, the condition is determined as a state in which the number of large targets is abnormally large, that is, a state of the adverse condition where the target cannot be normally detected due to the stains on the sensor or adverse weather.

Accordingly, in Step S110, in the case where both of the condition a and the condition $\beta$ are satisfied, the condition is determined as a state of the adverse condition in which the target cannot be normally detected due to the stains on the sensor or adverse weather.

In Step S110, it is determined whether the conditions of resetting the adverse condition determination of the step S100 are satisfied, or not. In this step, if the determination is yes, the processing is advanced to Step S120 whereas if the determination is no, the processing is advanced to Step S130.

As the conditions of resetting the adverse condition determination, there are a case in which the large target counter value continues the state of 0 for 20 seconds, or a case in which the emission of the laser beam stops.

In Step S120, since the conditions of resetting the adverse condition determination are satisfied, the determination of the adverse condition is canceled. More specifically, a flag (adverse condition flag) set when it is determined that the conditions are adverse is cleared (1 is changed to 0). The large target counter value is also cleared.

In Step S130, since the conditions for resetting the adverse condition determination are not satisfied, the determination of the adverse conditions in Step S100 is decided, the adverse condition flag is set (set to 1), and this processing is terminated once.

Accordingly, in the case where it is determined that the conditions are adverse on the basis of the determination results in this processing, various vehicle controls such as a tracking control, for example, using an output of the laser radar sensor 5 are inhibited, thereby making it possible to further enhance the security.

Subsequently, a description will be given of processing of the large target counter value used in the process of determining the adverse conditions with reference to FIG. 4. This processing is implemented for every given period.

In Step S200 of FIG. 4, a target recognizing process that will be described later is conducted. The target recognizing process is a process for determining whether the data obtained by the laser radar sensor 5 is data indicative of the object such as the anterior vehicle in fact, or not. As the target recognizing process, there can be applied the target recognizing processes disclosed in, for example, Japanese Patent application No. 2002-368903, JP 11-38141A and JP 7-318652A.

In a subsequent step S210, it is determined whether the conditions of a large target are determined in Step S200, or not. If the determination is yes in this step, the processing is advanced to Step S220 whereas if the determination is no, this processing is terminated.

As the above conditions, the following satisfied conditions can be applied:

<Satisfied Conditions>

Condition A and condition B and condition C and (condition D or condition E) and condition F Condition A: a distance Z ($10\ m \leqq Z \leqq 20\ m$)
Condition B: a lateral position X ($|X| \leqq 2\ m$)
Condition C: a lateral width W1 ($W1 \geqq 2\ m$)
Condition D: a lateral width W2 ($W2 \geqq 4\ m$)
Condition E: a depth D ($D \geqq 5\ m$)
Condition F: Subject vehicle velocity Vn ($Vn \geqq 5\ km/h$)

The conditions required for not satisfying the large target conditions are defined as when the above-conditions are not satisfied.

In this example, the distance Z (a distance between the subject vehicle and the object) and the lateral position X (displacement in the lateral direction from the center position of the subject vehicle) are entered as the conditions because the probability that the object such as the anterior vehicle exists in a range covered by the laser beam is high taking the covered range into consideration. The reason that the conditions of the lateral width W1 (in particular, the lateral width W2) are entered is because when the lateral width is too long, the possibility that the target is large to the degree that does not actually exist is high. The reason that the condition of the depth D is entered is because when the depth is too deep, the possibility that the target is large to the degree that does not actually exist is high. The reason that the condition of the subject vehicle velocity Vn is entered is because in the case where the subject vehicle velocity is extremely low such as 0, the satisfied conditions are liable to be excessively satisfied by continuing the same conditions.

In Step S200, since it is determined that the target is large, the quantity counter value is counted up in order to count the quantity.

In Step S230, it is determined whether the determination of the large targets has been completed, or not, with respect to 18 targets that have been recognized as the targets in the step S200 (that is, decided as not noises but the objects). When the determination is yes in this step, the processing is advanced to Step S240 whereas when the determination is no, the processing is returned to the step S210, and the same determination is repeated.

In Step S240, since the determination of all of the 18 targets has been completed, the large target counter is counted according to the counted number of large objects, and the processing is terminated once.

For example, as indicated below, the count up value (subtraction in the case of minus) of the large target counter is set according to the number of large targets among the 18 targets.

5 or more: +2
3 and 4: +1
1 and 2: −1
0: −2

In the case where the subject vehicle velocity is 0, the large target counter is set to 0, and the increment is inhibited. The large target counter value is always set to 0 or more.

As described above, in this processing, the large target is counted, and the large target counter value used in the determination of the adverse conditions can be set according to the counted number of large targets.

Since the large target counter is updated every time the 18 targets (object group) are recognized, it can be determined whether the state is the adverse conditions under which the target cannot be normally detected due to the stains of the sensor or the adverse weather, or not, according to the determination of the condition β "the large target counter value is equal to or more than a given value (for example, 50) in Step S100 of FIG. 3 by using the large target counter.

Subsequently, a description will be given of a target recognizing process used in the processing of the large target counter value with reference to FIG. 5. This processing is implemented every given period.

Since this processing is substantially identical with the contents disclosed in a Japanese Patent Application that has already been filed (refer to JP 2002-368903), this processing will be described in brief.

Figure 5:
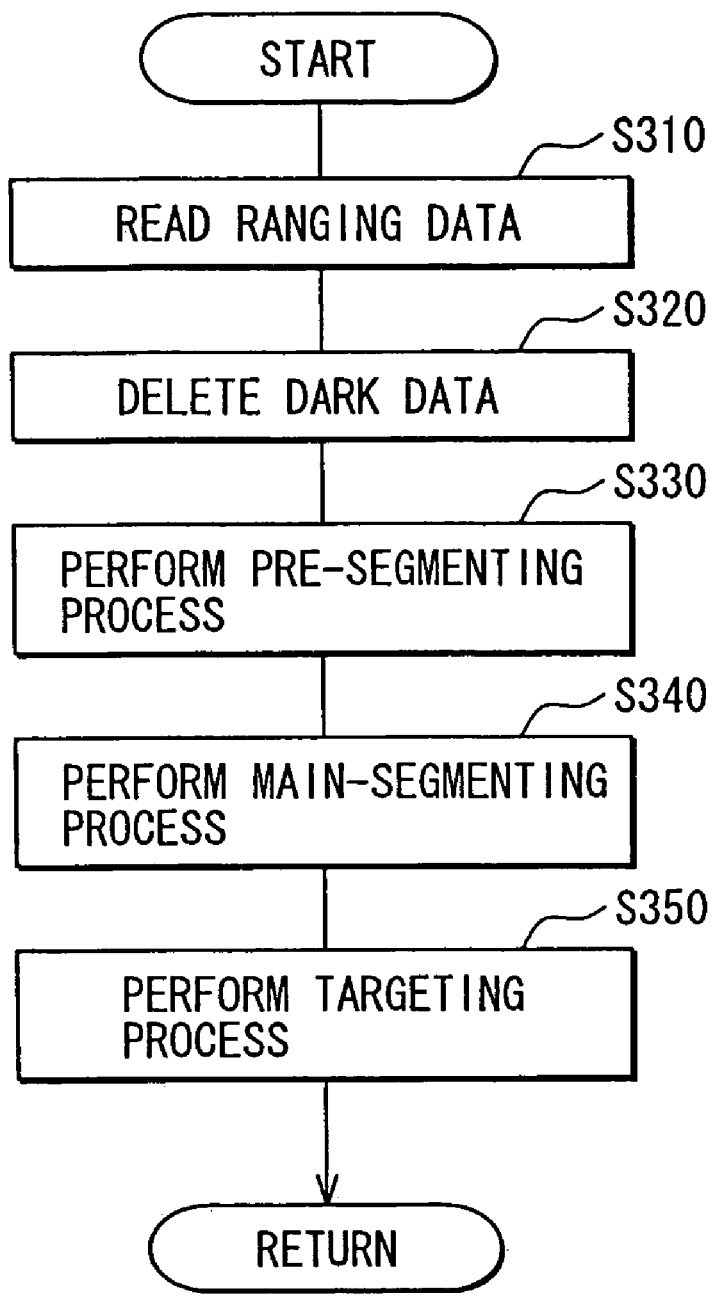
FIG. 5 is a flowchart showing an object recognition process according to the present invention.

FIG. 5 is a flowchart showing a main process of the object recognition.

First, in Step S310 of FIG. 5, ranging data is read every one scanning line from the laser radar sensor 5.

In Step S320, data that is weak in the received light intensity is deleted from the read ranging data.

In Step S330, the pre-segmenting process of the ranging data is conducted.

In Step S340, the main segmenting process of the pre-segmented ranging data is conducted.

Figure 6:
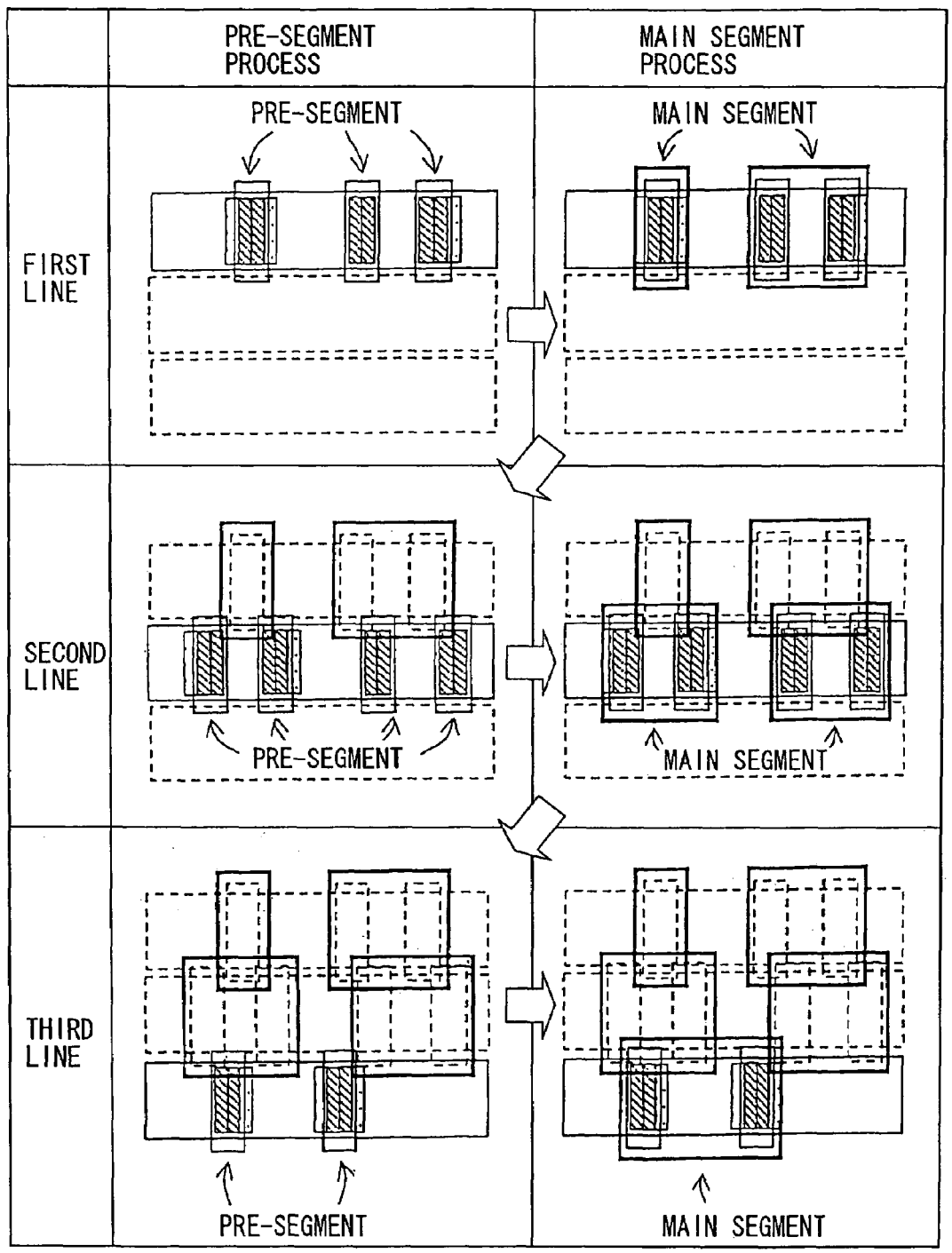
FIG. 6 is an explanatory diagram illustrating a pre-segmenting process and a main segmenting process of the present invention.

In this step, the pre-segmenting process and the main segmenting process will be described. FIG. 6 is an explanatory diagram showing a flow of the pre-segmenting process and the main segmenting process, and their outline.

First, the flow of the pre-segmenting process and the main segmenting process will be described.

As shown in FIG. 6, the pre-segmenting process is conducted on the ranging data of a first scanning line. That is, the ranging data that satisfies the pre-segmenting conductions is collected to form the pre-segment. Then, the main segmenting process is conducted on the pre-segmented ranging data of the first scanning line. In the main segmenting process, in the case where the pre-segments that have been formed by the pre-segmenting process satisfy the main segmenting conditions, those pre-segments are connected to each other to form the main segment.

Subsequently, the pre-segmenting process and the main segmenting process are conducted on the ranging data of a second scanning line, and finally the pre-segmenting process and the main segmenting process are conducted on the ranging data of a third scanning line. As described above, the pre-segmenting process and the main segmenting process are sequentially executed every scanning line.

Subsequently, the pre-segmenting process, more particularly, the pre-segmenting conditions will be described with reference to FIGS. 7A and 7B.

Figure 7A:
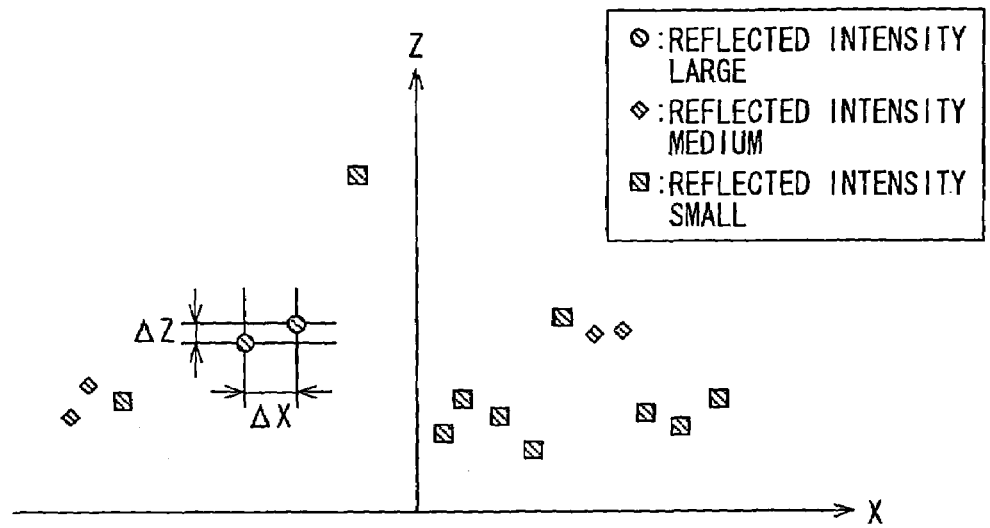
FIG. 7A is a graph showing ranging data according to the present invention.

As shown in FIG. 7A, in the case where the ranging data of one scanning line has been transformed into an X-Z orthogonal coordinate, the respective ranging data indicates the reflected object in front of the subject vehicle as a dot. In the case where the dot data indicative of those reflected objects as the dots satisfy the three following conditions (pre-segmenting conditions), the dot data is integrated to prepare the pre-segment.

i) A difference $\Delta Z$ in the distance in the Z-axial direction is a given distance or shorter.

ii) A difference $\Delta X$ in the distance in the X-axial direction is a given distance or shorter.

iii) The received light intensities are classified into the same groups.

In addition, in the case where any one of the two following conditions iv) and v) is satisfied, the ranging data is not dealt with as the pre-segment.

iv) In the case where a distance to the reflected object is a given distance or shorter, the ranging data is not integrated with other ranging data (in the case where the reflected light of only one laser beam is obtained, singularly).

v) The number of integrated ranging data is a given number or less, and the received light intensity is classified into a group of small light received intensity.

Figure 7B:
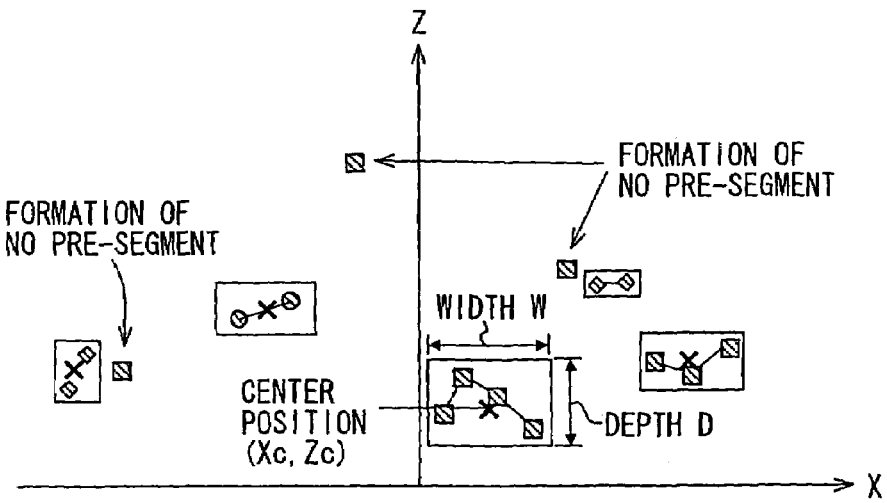
FIG. 7B is a graph showing pre-segmented data according to the present invention.

When the ranging data shown in FIG. 7A is pre-segmented according to the pre-segmenting conditions, 5 pre-segments are formed as shown in FIG. 7B.

Then, the positions (X, Z) of the respective ranging data are averaged in the respective pre-segments to obtain the center positions (Xc, Zc), and the lateral width W and the depth D are obtained on the basis of the minimum and the maximum of the positions (X, Z) of the respective ranging data.

Returning to FIG. 5, in Step S340, the main segmenting process is conducted, and in the case where the pre-segments that have been formed from the ranging data of one scanning line satisfy the main segmenting conditions, those pre-segments are integrated as the main segment. The main segmenting condition is that a difference ($\Delta Xc$, $\Delta Zc$) of the center position (Xc, Zc) of the pre-segments is an integration determination distance ($\Delta X$, $\Delta Z$), respectively.

Figure 8:
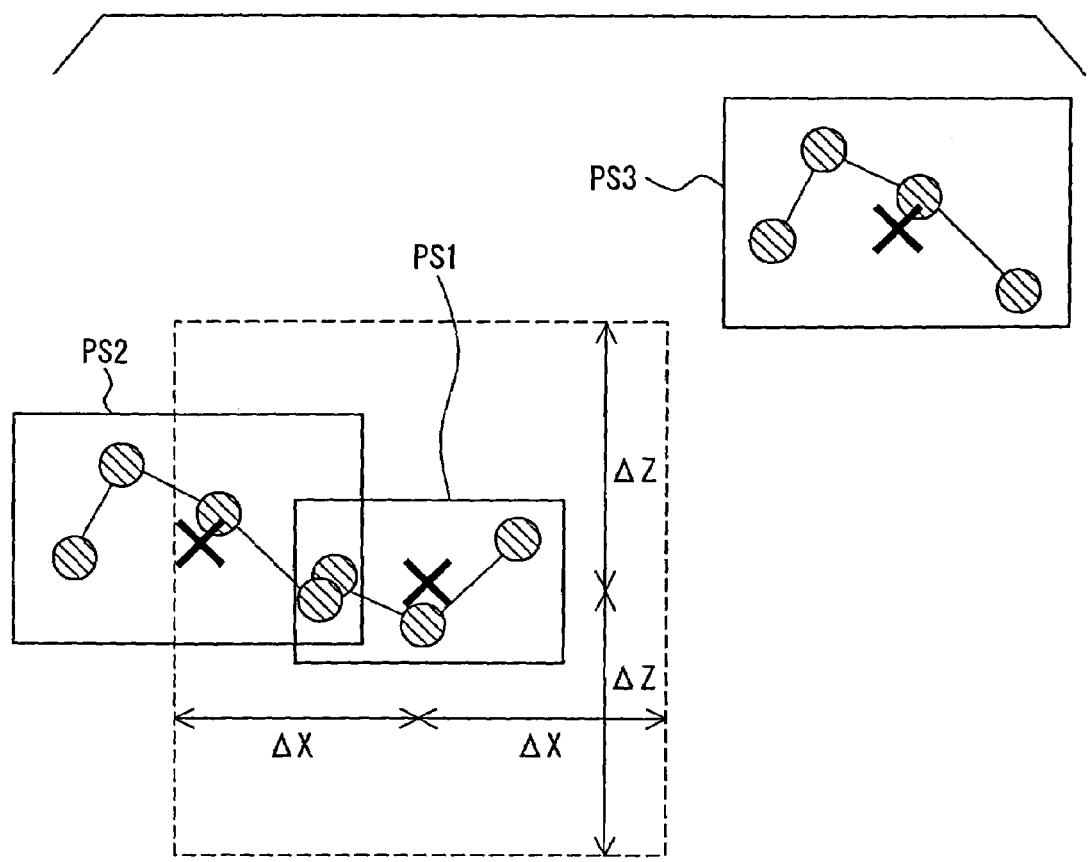
FIG. 8 is an explanatory diagram for explaining the main segmenting process of the present invention.

As a result, as exemplified in FIG. 8, regions corresponding to the integration determination distance ($\Delta X$, $\Delta Z$) are set in the X-axial direction and the Z-axial direction according to distances Z to the pre-segments PS1, PS2 and PS3, respectively.

Then, the distance 2 to the main segment is calculated according to the pre-segment that is extracted according to the received light intensity. Also, the depth D is obtained from a difference between the minimum distance and the maximum distance Z of the extracted pre-segment.

In addition, the lateral width W of the main segment is calculated. More specifically, the lateral width W of the main segment is first calculated by using all of the pre-segments. That is, the lateral width W is calculated from the position of the ranging data, which is positioned at the rightmost end and the leftmost end among all of the pre-segments. In the case where the calculated lateral width W is smaller than the maximum value W0 of the lateral width that is normally provided as the vehicle, the lateral width W is set as it is.

In the case where the calculated lateral width is larger than the maximum value W0, and the main segment is made up of plural pre-segments different in the received light intensity, the lateral width of the main segment is calculated except for the pre-segments of the smaller light received intensity.

As described above, when the main segment is formed every scanning line, the targeting process is then conducted as shown in Step S350.

Figure 9:
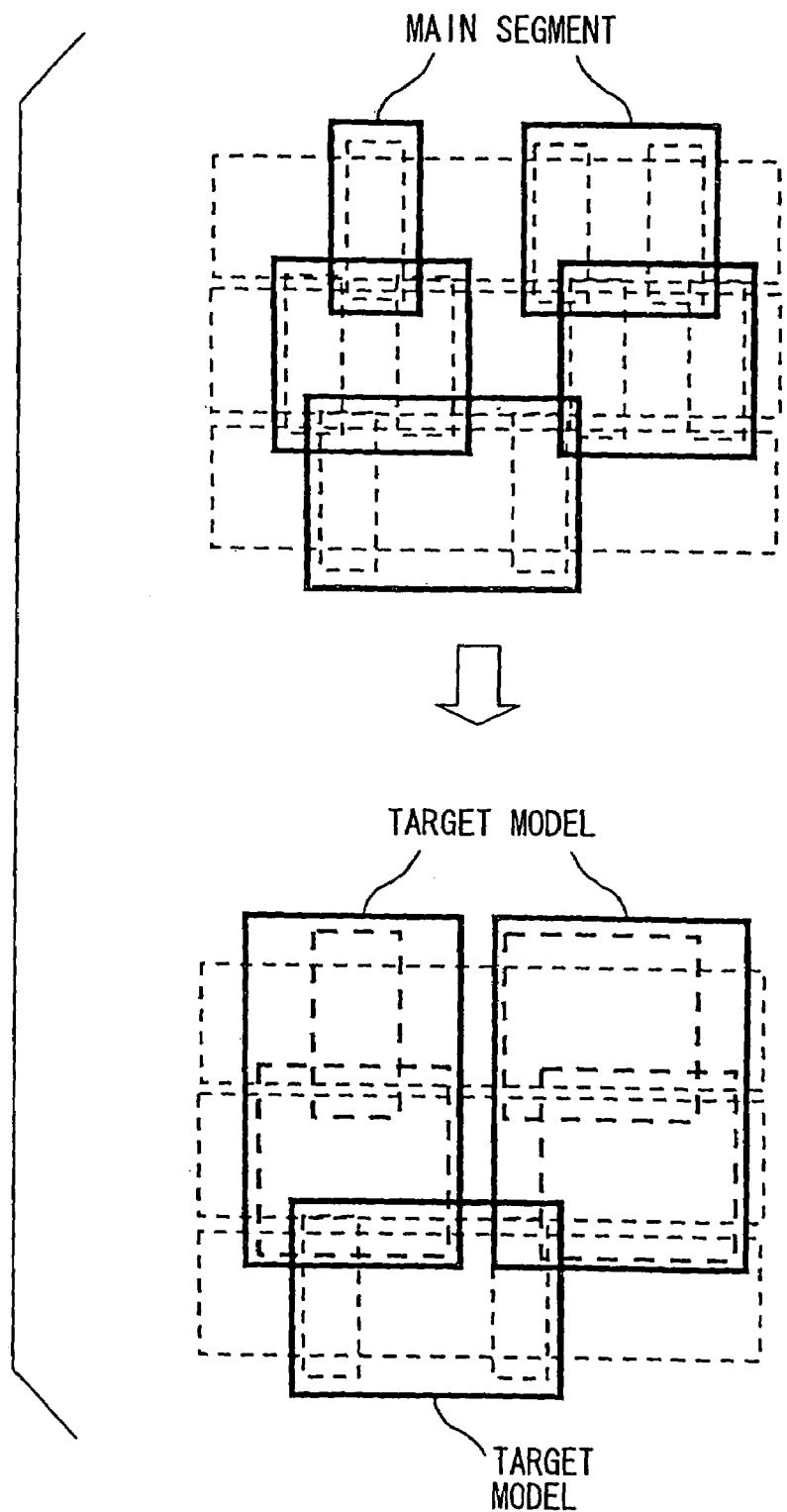
FIG. 9 is an explanatory diagram for explaining a targeting process of the present invention.

In the targeting process, as shown in FIG. 9, it is determined whether the main segments in the respective scanning lines should be integrated together, or not. Then, the main segments that are determined to be integrated together are connected to each other as an integral target mode.

Figure 10:
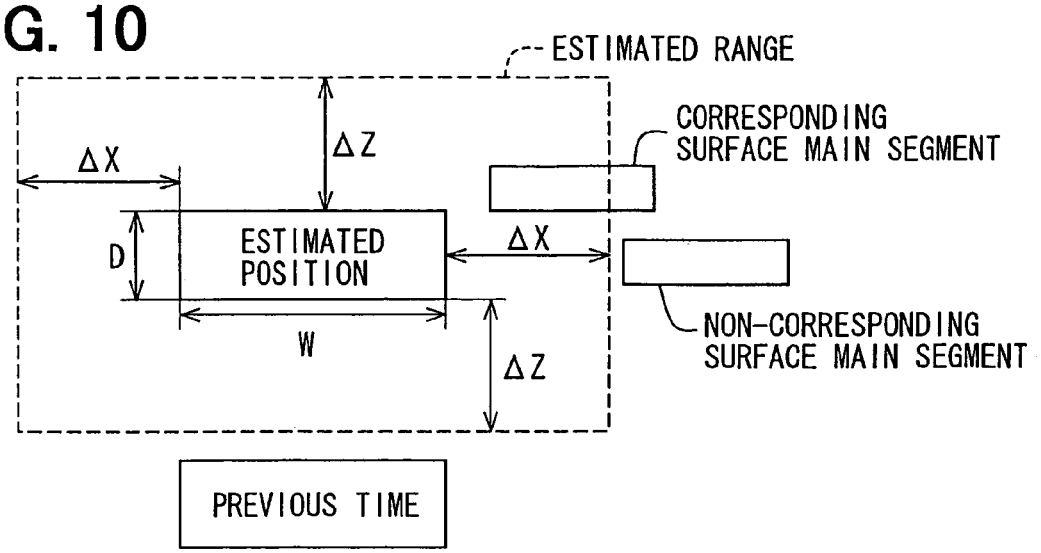
FIG. 10 is an explanatory diagram for explaining an integrating condition of the targeting process of the present invention.

Hereinafter, the targeting process will be described with reference to an explanatory diagram shown in FIG. 10 and a flowchart shown in FIG. 11.

Figure 11:
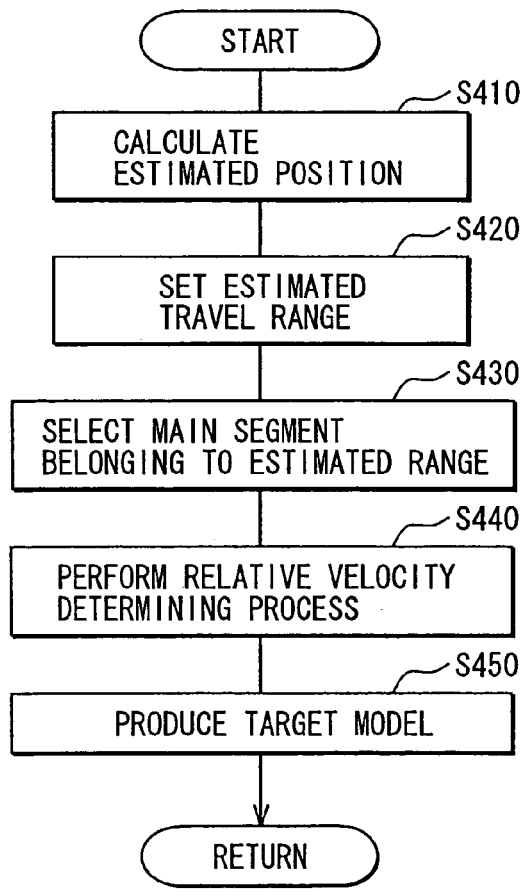
FIG. 11 is a flowchart showing the targeting process of the present invention.

In the targeting process, in Step S410 of FIG. 11, the estimated positions of the respective main segments are calculated. That is, as shown in FIG. 10, in the case where it is assumed that the main segment moves at a relative speed at the previous processing time from the position of the previous processing time, the estimated position at which the main segment may exist is calculated.

In Step S420, an estimated travel range having a given amount of width in the respective X-axial and Z-axial directions is set around the estimated position.

In Step S430, the main segment at least a part of which is included in the estimated travel range is selected.

In Step S440, in the case where there exist plural main segments that are selected in Step S430, it is determined whether differences ($\Delta Vx$, $\Delta Vz$) of the relative velocities of the respective main segments in the X-axial and Z-axial directions are smaller than a given velocity difference ($\Delta Vx0$, $\Delta Vz0$), respectively, or not.

In Step S450, in the case it is determined that the relative velocity difference ($\Delta Vx$, $\Delta Vz$) is smaller than the given velocity difference ($\Delta Vx0$, $\Delta Vz0$) in Step S440, those plurality of main segments are regarded as the integration, and those plural main segments are integrated together to form the target model.

That is, the lateral width Wm and the depth Dm are obtained from the minimum value and the maximum value of the ranging data belonging to the plural main segments in the X-axial direction and the Z-axial direction. Also, the distances to the respective main segments are averaged to obtain the distance Zm to the target model.

As described above, in this embodiment, the satisfied conditions using the given conditions A to F are applied to the respective 18 targets that are decided as the objects, and when the satisfied conductions are met, it is determined that the target is large.

In addition, the number of large targets is counted on the basis of the determination results every object group consisting of 18 objects, and the large object counter value is sequentially changed according to the counted value. That is, in the case where a large number of large targets exist in one object group, the large target counter value is greatly counted up, whereas in the case where a small number of large targets exist in one object group, the large target counter value is slightly counted up, not counted up, or counted down.

Then, in the case where the condition $\beta$ that the large target counter value is a given value or more, and the condition $\alpha$ that the wiper switch 10 is on are satisfied, it is determined that the stains adhere to the sensor surface, or the conditions are adverse such as the rainy weather.

As a result, since it can be precisely judged that the detection of data such as a distance to the anterior vehicle cannot be conducted with high precision by the laser radar sensor 5, the vehicle control such as the tracking control using the output of the laser radar sensor 5 is, for example, inhibited, resulting in the remarkable advantage that the safety on the vehicle travel is further improved.

The present invention is not limited to the above embodiments, but can be implemented by various embodiments within the subject matter of the present invention.

For example, in the above embodiments, the laser radar sensor using the laser beam is applied. Alternatively, electric waves such as millimeter wavers or supersonic waves may be used. Also, the scan system may be replaced by a system that can measure the orientation other than the distance.

What is claimed is:

1. An object recognition device for a vehicle that irradiates transmitting waves away from a subject vehicle, acquires data corresponding to objects around the subject vehicle on the basis of reflected waves of the transmitting waves, and recognizes the objects on the basis of the data, the object recognition device comprising:
    size determining means for determining a size of each of the recognized objects and that each of the recognized objects is large when at least a width of the recognized object is larger than a given determination value such that there is a high possibility that the recognized object does not exist;
    existence condition determining means for determining whether at least a given number of the objects greater than two are determined to be large by the size determining means;
    adverse condition determining means for identifying an adverse condition under which the objects cannot be normally detected when the given number of the objects are determined to be large by the existence condition determining means; and
    control means for stopping vehicle travel control which uses the data acquired on the basis of the reflected waves when the adverse condition is identified.

2. The object recognition device according to claim 1, wherein at least the given number of the objects that are determined to be large objects exist in an object group including the recognized plurality of objects.

3. The object recognition device according to claim 2, wherein a plurality of determinations of the object group are implemented and the determinations are identified as adverse on the basis of the plurality of determination results.

4. The object recognition device according to claim 1, wherein it is determined that at least the given number of the large objects exist by the existence condition determining means.

5. The object recognition device according to claim 4, wherein a counter value used for determining the adverse conditions is changed according to the number of the objects that are determined as the large objects.

6. The object recognition device according to claim 5, wherein a variable value that changes the counter value is set for each of the object groups.

7. The object recognition device according to claim 5, wherein in a case where a velocity of the subject vehicle is lower than a given determination value, the counter value is set to 0.

8. The object recognition device according to claim 5, wherein in the case where a state in which the counter value is 0 continues for a given period of time after the determination of the adverse conditions is established, the determination of the adverse conditions is canceled.

9. The object recognition device according to claim 1, wherein a determination is made taking the operation of a wiper into consideration when it is determined that the conditions are adverse.

10. The object recognition device according to claim 1, wherein it is determined that the recognized object is large when all of the following conditions are satisfied:
    a distance to the recognized object is within a given range;
    a lateral position of the recognized object is within a given range;
    the width of the recognized object is larger than the given determination value; and
    a velocity of the subject vehicle is at least equal to a given value.

11. The object recognition device according to claim 10, wherein in the case where any one of the conditions is not satisfied, it is determined that the object is not large.

12. The object recognition device according to claim 1, wherein it is determined that the recognized object is large when all of the following conditions are satisfied:
    a distance to the recognized object is within a given range;
    a lateral position of the recognized object is within a given range;
    the width of the recognized object is larger than the determination value;
    a depth of the subject vehicle is at least equal to a given value; and
    a velocity of the subject vehicle is at least equal to a given value.

13. The object recognition device according to claim 12, wherein in the case where any one of the conditions is not satisfied, it is determined that the object is not large.

14. The object recognition device according to claim 1, further comprising means for determining a distance to the objects.

15. The object recognition device according to claim 1, wherein the size determining means determines the size of the object based upon at least one of a lateral width and a depth of the object.

16. The object recognition device according to claim 1, wherein the size of the object is a two dimensional size of the object.

17. An object recognition device for a vehicle that irradiates transmitting waves away from a subject vehicle, acquires data corresponding to objects around the subject vehicle on the basis of reflected waves of the transmitting waves, and recognizes the objects on the basis of the data, the object recognition device comprising:
    size determining means for determining a size of each of the recognized objects and that each of the recognized objects is large when the size of the recognized object is larger than a given determination value such that there is a high possibility that the recognized object does not exist;
    existence condition determining means for determining whether at least a given number of the objects greater than two are determined to be large by the size determining means; and
    adverse condition determining means for identifying an adverse condition under which the objects cannot be normally detected when the given number of the objects are determined to be large by the existence condition determining means; wherein
    a determination is made taking the operation of a wiper into consideration when it is determined that the conditions are adverse.

18. An object recognition device for a vehicle that irradiates transmitting waves away from a subject vehicle, acquires data corresponding to objects around the subject vehicle on the basis of reflected waves of the transmitting waves, and recognizes the objects on the basis of the data, the object recognition device comprising:

size determining means for determining a size of each of the recognized objects based on a width and a depth of each of the recognized objects and that each of the recognized objects is large when the size of the recognized object is larger than a given determination value such that there is a high possibility that the recognized object does not exist;

existence condition determining means for determining whether at least a given number of the objects greater than two are determined to be large by the size determining means; and adverse condition determining means for identifying an adverse condition under which the objects cannot be normally detected when the given number of the objects are determined to be large by the existence condition determining means.

19. The object recognition device according to claim 18, wherein at least the given number of the objects that are determined to be large objects exist in an object group including the recognized plurality of objects.

20. The object recognition device according to claim 18, wherein it is determined that at least the given number of the large objects exist by the existence condition determining means.

21. The object recognition device according to claim 18, wherein a determination is made taking the operation of a wiper into consideration when it is determined that the conditions are adverse.

22. The object recognition device according to claim 18, wherein it is determined that the object is large when all of the following conditions are satisfied:

a distance to the object is within a given range (condition A);

a lateral position of the object is within a given range (condition B);

a lateral width of the object is at least equal to a given threshold value (condition C);

the lateral width of the object is at least equal to a given threshold value (condition D), wherein the threshold value C<the threshold value D; and a velocity of the subject vehicle is at least equal to a given value (condition F).

23. The object recognition device according to claim 18, wherein it is determined that the object is large when all of the following conditions are satisfied:

a distance to the object is within a given range (condition A);

a lateral position of the object is within a given range (condition B);

a lateral width of the object is at least equal to a given threshold value (condition C);

a depth of the subject vehicle is at least equal to a given value (condition E); and a velocity of the subject vehicle is at least equal to a given value (condition F).

24. An object recognition device for a vehicle that irradiates transmitting waves away from a subject vehicle, acquires data corresponding to objects around the subject vehicle on the basis of reflected waves of the transmitting waves, and recognizes the objects on the basis of the data, the object recognition device comprising:

means for determining a high possibility that each of the recognized objects does not exist when a width of the recognized object is larger than a given value;

means for determining whether a specified number of the objects greater than two are determined to have the high possibility to not exist;

means for identifying an adverse condition under which the objects cannot be normally detected when the specified number of the objects are determined to have the high possibility to not exist; and means for stopping vehicle travel control which uses the data acquired on the basis of the reflected waves when the adverse condition is identified.

* * * * *